Miller and Bidwell,
Knitting-Needle.

Nº 61,630. Patented Jan. 29, 1867.

Attest:
J. E. Dennis
Chas Hadaway

Inventor:
Job Miller
Jason A. Bidwell
J Dennis Jr Atty

United States Patent Office.

JOB MILLER, OF WARREN, RHODE ISLAND, AND JASON A. BIDWELL, OF EAST BOSTON, MASSACHUSETTS.

Letters Patent No. 61,630, dated January 29, 1867.

IMPROVEMENT IN KNITTING-MACHINE NEEDLES.

The Schedule referred to in these Letters Patent and making part of the same.

TO ALL WHOM IT MAY CONCERN:

Be it known that we, JOB MILLER, of Warren, Bristol county, State of Rhode Island, and JASON A. BIDWELL, of East Boston, Suffolk county, State of Massachusetts, have invented certain new and useful Improvements in Knitting-Needles; and we do hereby declare the following description and accompanying drawings are sufficient to enable any person skilled in the art or science to which it most nearly appertains to make and use our said invention or improvements without further invention or experiment.

The nature of our invention consists in a stitch-caster, hung or fastened to the rear end of the shank of a hooked needle; and in a cam arranged between the shank of the needle and the shank of the stitch-caster, to raise the latter at the proper time to cast the stitch and let it drop so that the yarn may be fed to the hook of the needle; and in making the stitch-caster to spring in one direction after being worked by a cam in the opposite direction. In the accompanying drawings—

Figure 1:
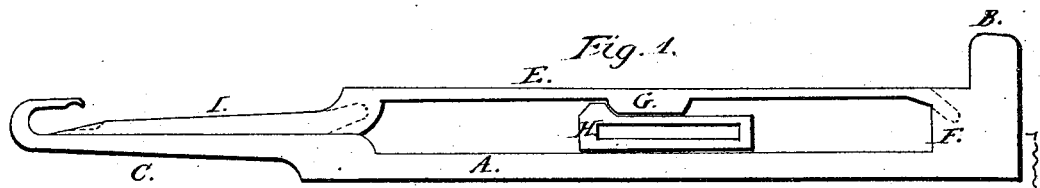
Figure 1 is an elevation of a hooked knitting-needle with our improvements.
Figure 2:
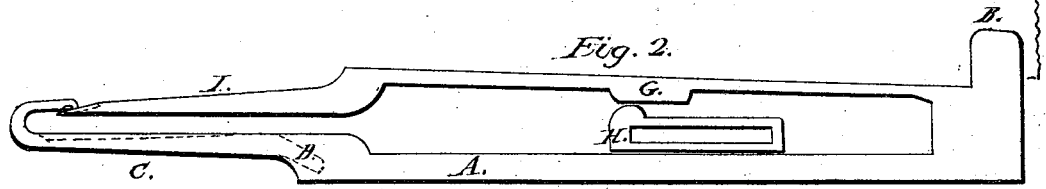
Figure 2 is an edge view.
Figure 2:
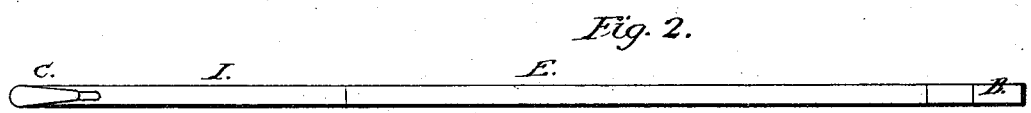
Figure 3:
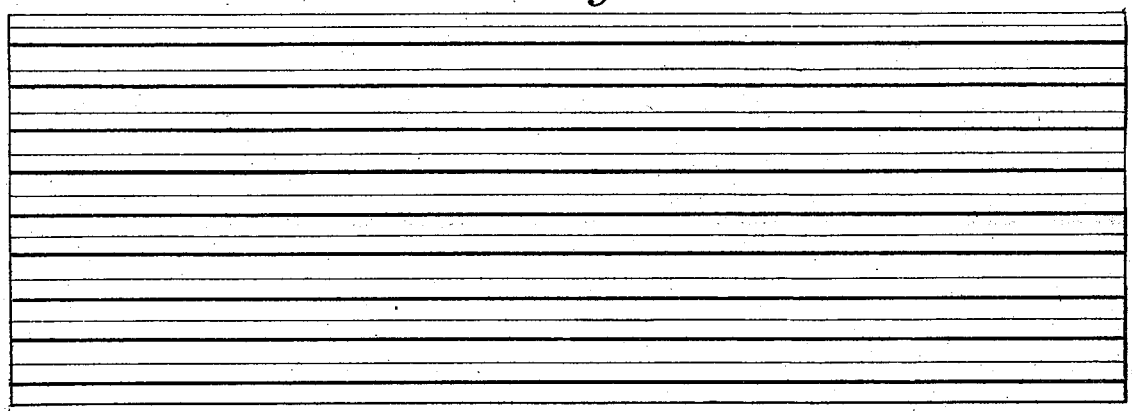
Figure 3 is the section of a grooved needle-plate in which the needles traverse in knitting.

In these drawings, A is the needle-bar or shank, made of steel in the form shown in the drawings, or in such other form as will answer the purpose, and its rear end projects up at B, at a right angle, to enter the groove in the cam that works the needle. This bar and the needle C, with its hook, may all be made in one piece, but we prefer to make them separate, and cut a notch in the end of the bar at D, and insert the rear end of the needle and solder it in. The bar or shank E of the stitch-caster may be made with the needle-bar and of the same piece, but we prefer to make it separate in the form shown in the drawing, and insert its rear end in a notch in the needle-bar, shown by dotted lines in fig. 1 at F, and solder it in. The bar E has a boss or projection, G, on its under side, against which boss the cam H works or acts at the proper time to raise the stitch-caster I up against the point of the hook, and hold it there until the stitch is cast off, and then let it drop, so that the yarn can be fed to the hook by the yarn-carrier to form a new stitch. The stitch-caster I and its shank E may both be made in one piece, but we prefer to make them in separate pieces and insert the rear end of the caster in a notch in the end of the shank and solder it in, as shown by dotted lines in fig. 1. The cam H may be made in the form shown or in such other form as will answer the purpose, and is held in position by a rod or bar passing through the hole in it, while the needle is traversed backwards and forwards on it, and as the projection G passes off of the cam, it springs down, the end of the caster entering the groove in the needle under the hook, shown by dotted line in fig. 1. There is a groove in the upper side of the end of the stitch-caster which receives the point of the needle-hook when the caster is raised to cast off the stitch.

Having described our improvements—

We claim a spring stitch-caster hung or fastened to the shank or bar of a hooked needle, in rear of the cam that lifts it.

We claim a cam arranged between the shank of the needle and the shank of the stitch-caster to raise the stitch-caster at the proper time to cast the stitch, and then let it drop so that the yarn may be fed to the hook of the needle.

We claim a stitch-caster made to spring in one direction after being worked by a sliding cam H in the opposite direction.

JOB MILLER,
JASON A. BIDWELL.

Witnesses:
GEO. H. SURGENS,
HENRY H. LUTHER.